No. 881,399. PATENTED MAR. 10, 1908.
J. M. HANSEN.
METHOD OF MAKING CIRCULAR WROUGHT METAL BLANKS.
APPLICATION FILED MAY 19, 1906.

WITNESSES.
J. R. Keller
Robert C. Totten

INVENTOR.
John M Hansen
By Kay Totten & White
Attorneys

UNITED STATES PATENT OFFICE.

JOHN M. HANSEN, OF PITTSBURG, PENNSYLVANIA, ASSIGNOR TO FORGED STEEL WHEEL COMPANY, OF PITTSBURG, PENNSYLVANIA, A CORPORATION OF PENNSYLVANIA.

METHOD OF MAKING CIRCULAR WROUGHT-METAL BLANKS.

No. 881,399.      Specification of Letters Patent.      Patented March 10, 1908.

Application filed May 19, 1906. Serial No. 317,742.

*To all whom it may concern:*

Be it known that I, JOHN M. HANSEN, a resident of Pittsburg, in the county of Allegheny and State of Pennsylvania, have invented a new and useful Improvement in Methods of Making Circular Wrought-Metal Blanks, and I do hereby declare the following to be a full, clear, and exact description thereof.

This invention relates to a method of forming circular wrought metal blanks and especially circular steel blanks to be afterwards formed into car wheels.

The object of the invention is to provide a method of forming such blanks which avoids the production of scrap or other waste of metal.

One of the difficulties encountered in the manufacture of wrought steel car wheels and other circular articles is the somewhat excessive cost, this being due to a considerable extent to the difficulty and expense of producing the circular blanks necessary for this method of manufacturing car wheels. Most prior attempts in this line have consisted in cutting or blanking the circular blank from a slab of metal, or taking a square slab or bloom and shearing the same to circular form. In both of these methods there is produced a large amount of scrap which has a low market value, and therefore adds materially to the cost of the finished product.

This invention has for its object to produce such circular wrought metal blanks at a minimum expenditure of time and labor, without the production of scrap or loss of metal of any kind, and in a manner not to stretch or strain the fiber of the metal.

The invention consists, generally stated, in heating a square, polygonal, or other irregularly shaped forged or rolled slab or bloom, and subjecting the angles of said blank to a radial pressure while confining the metal of the edges of the blank against side flow.

Figure 1:
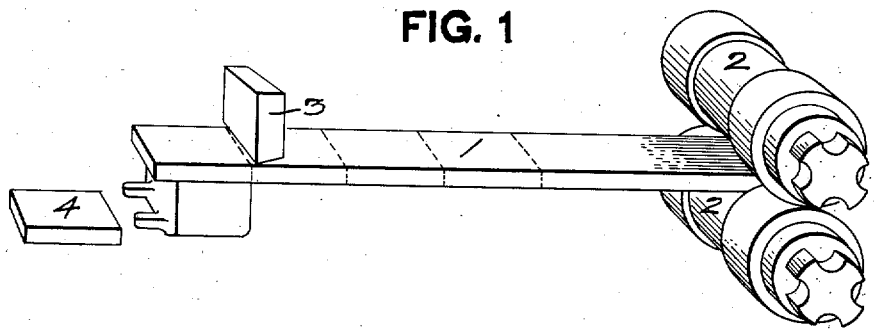
Figure 2:
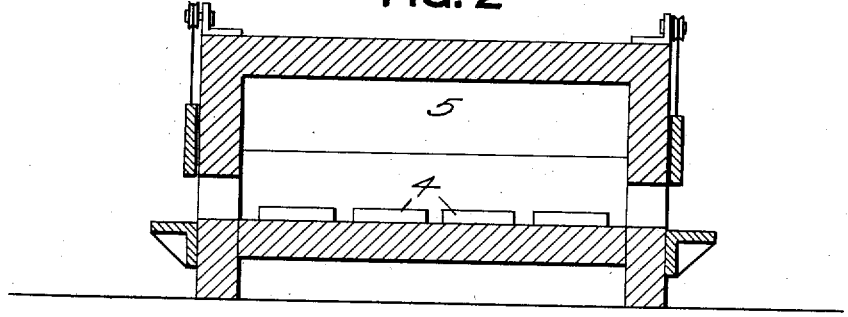
Figure 4:
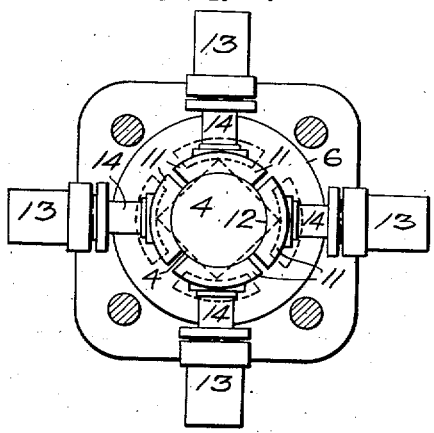
Figure 3:
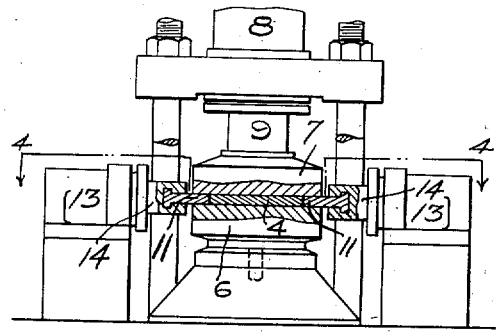
Figure 5:

In the accompanying drawings Figure 1 is a perspective diagrammatic view illustrating the formation of the initial slab or bloom; Fig. 2 illustrates the heating thereof; Fig. 3 is a vertical section of suitable apparatus for forming the same to circular shape; Fig. 4 is a horizontal section of the same on the line 4—4, Fig. 3, showing in dotted lines the various positions of the dies; and Fig. 5 is a perspective view of the finished blank.

In carrying out the invention I start with such a slab or bloom as can be most cheaply or conveniently obtained or produced, preferably a square slab, as this can be easily cut from a long rolled slab without the production of scrap or other waste, and hence can be produced or obtained at a low cost. Fig. 1 shows a slab 1 produced by rolls 2, and shears 3 for cutting the same into initial blanks 4. Such slab is then raised to a good forging heat in any suitable way, as in a furnace 5 shown in Fig. 2. It is then subjected to the action of suitable compressing mechanism for reducing the same to circular form. Various forms of apparatus for this purpose will readily suggest themselves and that shown in the drawings is only one of many forms that may be used. The essentials of the apparatus consist of suitable clamping and side confining dies 6 and 7 between which the blank 4 is firmly clamped. These clamping dies may be actuated by any suitable forcing mechanism, such as a hydraulic cylinder 8 having its piston rod 9 connected to one of said dies. Preferably such forcing mechanism will be of a type so that the die to which it is connected can be worked back and forth to assist in the reduction of the blank to circular form. A hydraulic cylinder is of this type.

The clamping dies 6 and 7 are of sufficient size to extend beyond all portions of the blank so that the metal at the edges of the blank is absolutely prevented from side flow. Coöperating with these clamping dies is one or more radially acting pressure means to act against the angles of the blank and reduce the same. Preferably a series of such radially acting pressure means will be used, the drawings showing one for each angle of the square blank. These pressure means are shown as dies 11, preferably having curved inner faces 12 and of a thickness to pass with a neat fit between the clamping dies 6 and 7. These edge dies may be actuated by any suitable forcing mechanism, such as hydraulic cylinders 13 whose piston rods 14 are connected to the dies.

In practicing my invention the square slab or bloom 4 is heated and placed between the dies 6 and 7 and tightly clamped therebetween. The radially acting dies 11 are then brought against the angles of the blank and forced inwardly. As the metal is confined against side flow it must necessarily flow peripherally of the blank. To assist in this the die 7 may be alternately slightly raised and again depressed, thus permitting the metal to flow inwardly toward the axis of the blank and when the die is again brought down flattening out such metal and distributing it throughout the body of the blank, the pressure dies 8 being slightly withdrawn as the upper die descends and then forced inwardly. The result is that the heated blank is quickly and effectively reduced to circular form and without the production of any scrap whatever and without straining the metal of the blank, but on the contrary rather with beneficial effect, as the metal, and especially at the periphery of the blank, is compressed and condensed. A blank of this character lends itself especially to the manufacture of car wheels which require a strong tough and hard periphery.

While I prefer to employ the upper confining die to confine the upward flow of the metal, it may be dispensed with when employing the series of radial pressure dies, in which case the blank will be rounded up by the radial pressure upon the blank of the dies traveling over the lower die, and while as perfect blanks cannot be formed in this way, the metal will be sufficiently distributed to produce the circular blank, especially as the blank being subsequently forged in the manufacture of the car wheel is subjected to heavy pressure and requires the blank to be only approximately brought to shape. Where only a single pressure die working on radial lines is employed the upper die is necessary to clamp and hold the blank. In this case between each such inward pressure strokes of the pressure die the blank should be turned to present the next projecting corner thereto, and for this purpose the lower die is mounted to turn as illustrated.

What I claim is:

1. The method of reducing polygonal or irregularly shaped metal blanks to circular or curved form, consisting in confining the metal at the edges against side flow, and while so confining the same subjecting the angles thereof when heated to a radial pressure to cause a peripheral flow of the metal to produce the circular blank.

2. The method of reducing square or irregularly shaped metal blanks to circular or curved form, consisting in heating the blank, clamping the side faces thereof and then subjecting the projecting portions thereof to radial pressure, thereby causing peripheral flow of the metal to produce the circular blank.

3. The method of transforming a polygonal forged or rolled metal slab or bloom into one of circular or curved outline, consisting in heating said blank, clamping the same between plates extending beyond the edges thereof, and then subjecting the angles of said blank to radially acting pressure, and thereby causing peripheral flow of the metal and producing the circular blank.

4. The method of transforming a polygonal forged or rolled metal slab or blank into one of circular or curved outline, consisting in heating the blank, then subjecting the angles thereof to radially acting pressure, and simultaneously therewith subjecting the sides of the blank to successive pressures to flatten out the metal at the edges.

5. The method of forming circular wrought metal blanks, consisting in cutting a square blank from a rolled metal slab, heating the same, and then subjecting the angles thereof to radially acting pressure while confining the metal at the edges against side flow.

In testimony whereof, I the said JOHN M. HANSEN have hereunto set my hand.

JOHN M. HANSEN.

Witnesses:
F. W. WINTER,
ROBERT C. TOTTEN.